No. 798,213. PATENTED AUG. 29, 1905.
T. REFSUM.
RAIL JOINT.
APPLICATION FILED OCT. 24, 1904.

Witnesses:
M. C. Siktberg.
Anton Skoprud

Inventor,
Thomas Refsum,
By Glenn S Noble
Att'y.

UNITED STATES PATENT OFFICE.

THOMAS REFSUM, OF CHICAGO, ILLINOIS.

RAIL-JOINT.

No. 798,213. Specification of Letters Patent. Patented Aug. 29, 1905.

Application filed October 24, 1904. Serial No. 229,719.

*To all whom it may concern:*

Be it known that I, THOMAS REFSUM, a subject of the King of Sweden and Norway, and a resident of Chicago, in the county of Cook and State of Illinois, have invented certain new and useful Improvements in Rail-Joints, of which the following is a specification.

This invention relates more particularly to rail joints or connections which occur in tracks for steam-railways, electric railways, tram-roads, or the like.

It consists more particularly in the combination with the rail ends of novel fish-plates, which are connected and bridged to support the ends of the rails and which are also provided with nut-locking devices.

The objects of this invention are to provide a rail-joint which will be economical in construction, which may be readily applied to the ends of the rails, which will securely and rigidly hold and support the ends of the rails in position, and which may also be removed for further use in making a new connection after one set of rails have become worn.

I have illustrated a preferred form of my device in the accompanying drawings, in which—

Figure 1:
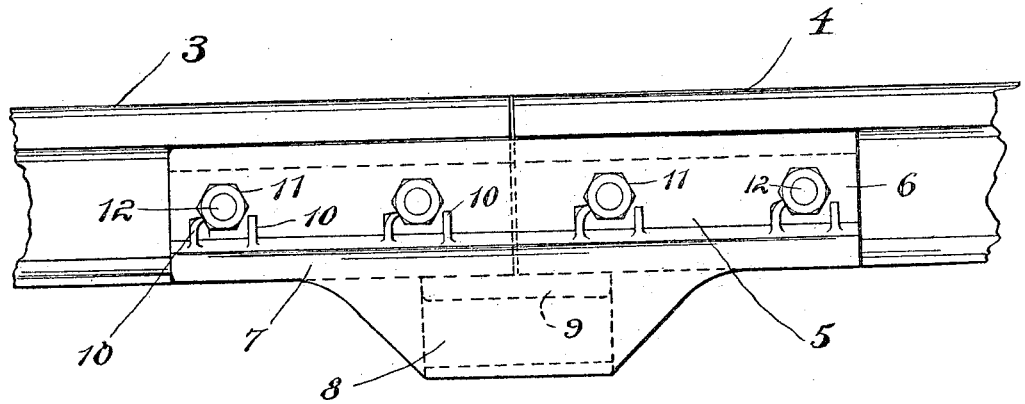
Figure 2:
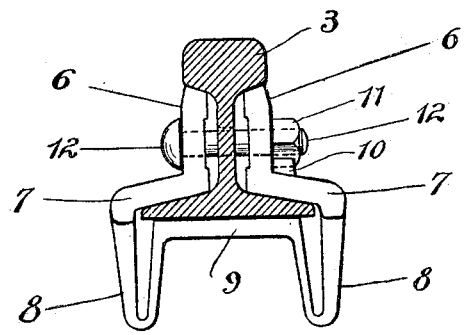

Figure 1 is a side elevation of an improved rail-joint embodying this invention, and Fig. 2 is a sectional end view of the device as shown in Fig. 1.

According to this invention the ends of the rails 3 and 4 are joined and securely held by means of laterally-connected fish-plates, or rather an improved connecting device 5. This device comprises two fish-plates or side pieces 6, which are adapted to fit in between the heads and the flanges of the rails 3 and 4. These plates are provided with longitudinal flanges 7, which rest upon the upper sides of the rail-flanges and extend somewhat beyond the same. These flanges 7 are provided at the center with depending U-shaped supports 8, which are connected by means of a plate 9, which is adapted to support the ends of the rails 3 and 4. The entire joining device and end support for the rails is preferably made integral, and the U-shaped supports are formed to allow a certain flexibility of the side plates, so that the latter may be brought into intimate contact with the rails. I prefer to make this device of cast-steel; but any other suitable material may also be employed. A further important feature consists in the narrow lugs or clips 10, which are arranged at either side of the nuts 11 of the fastening-bolts 12, the lugs being adapted to form substantial nut-locks. It is apparent that when the nut has been drawn to position one of the lugs 10 may be bent in to engage with said nut to prevent its turning. When it is desired to disconnect the rails, this lug can be bent out to release the nut. The remaining lug may then be used for locking the nut when the device is again used in making a new joint.

The operation of this device will be readily understood from the drawings. The connecting device 5 is preferably cast with the plates somewhat farther apart than when in normal position. The device is first brought into engagement with the end of one of the rails and the bolts inserted, when the other rail may be slipped into position and the remaining bolts put in place. When the bolts have been tightened and the lugs bent over to lock the nuts, a rigid and substantial joint will be formed, with the ends of the rails supported in a desirable manner by the cross-plate 9.

Having thus described my invention, which I do not wish to limit to the exact details shown and described, what I claim, and desire to secure by Letters Patent, is—

1. A rail-joint, comprising suitable plates having projecting flanges, depending U-shaped supports from said flanges, and a cross-plate formed integrally with said supports and adapted to support the ends of the rails.

2. The combination with the ends of two rails, of joint-plates having projecting flanges, depending U-shaped supports integrally connected with said flanges, and a lateral plate engaging with the bottoms of the ends of said rails, also integrally connected with the upturned portions of said supports, and bolts or the like connecting said joint-plates and said rails.

3. In a combined rail-joint and nut-lock, the combination with suitable fish-plates having a lateral integral connecting-plate, of lugs formed integrally with said fish-plates and adapted to be bent to engage with the nuts of suitable connecting-bolts to prevent said nuts from becoming loosened.

4. In a combined rail-joint and nut-lock, the combination of connecting side plates having projecting flanges, a bridge for supporting the ends of the rails resiliently connected with said flanges, and projecting lugs adapted to be bent to engage with the ends or nuts of suitable connecting-bolts.

THOMAS REFSUM.

Witnesses:
ANTON SKOFSRUD,
WILLIAM H. DUVAL.